(12) United States Patent
Hymel et al.

(10) Patent No.: US 8,750,794 B2
(45) Date of Patent: Jun. 10, 2014

(54) MOBILE WIRELESS COMMUNICATIONS DEVICE PROVIDING OBJECT COMPARISON FEATURES BASED UPON NEAR FIELD COMMUNICATION (NFC) AND RELATED METHODS

(75) Inventors: James Allen Hymel, Kitchener (CA); Jean Philippe Bouchard, Waterloo (CA); Jeffery Erhard Lindner, Los Gatos, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 410 days.

(21) Appl. No.: 13/178,582

(22) Filed: Jul. 8, 2011

(65) Prior Publication Data
US 2013/0012124 A1     Jan. 10, 2013

(51) Int. Cl.
*H04B 5/00* (2006.01)

(52) U.S. Cl.
USPC ...... 455/41.1; 455/41.2; 455/100; 455/414.1; 340/500; 382/100

(58) Field of Classification Search
USPC ......... 455/41.1, 41.2, 100, 414.1, 404.2, 410, 455/575.6, 566; 382/100, 115; 340/500, 340/540, 5.52, 10.1
See application file for complete search history.

(56) References Cited

U.S. PATENT DOCUMENTS

| 7,362,210 B2* | 4/2008 | Bazakos et al. | 340/5.53 |
| 7,362,219 B2* | 4/2008 | Nogami et al. | 340/505 |
| 8,208,681 B2* | 6/2012 | Heller et al. | 382/100 |
| 2006/0082439 A1 | 4/2006 | Bazakos et al. | |
| 2008/0095527 A1 | 4/2008 | Lee et al. | |
| 2009/0161918 A1* | 6/2009 | Heller et al. | 382/115 |
| 2009/0185763 A1 | 7/2009 | Park et al. | |
| 2012/0143726 A1* | 6/2012 | Chirnomas | 705/27.1 |

FOREIGN PATENT DOCUMENTS

EP     1533767     5/2005

OTHER PUBLICATIONS

"The RFID Weblog: RFID Cigarette Vending Machine with Face Recognition Software: Are They Foolproof?" http://www.rfid-weblog.com/50226711/rfid_cigarette_vending_machine . . . Printed Oct. 7, 2010.
"Patently Apple: Apple Gearing Up for the Coming NFC—iPhone Revolution" http://vvww.patentlyapple.com/patently-apple/2010/04/apple-gearing . . . Printed Oct. 7, 2010.
N. Jobanputra, V. Kollkarmi, D, Rao, and Jerry Gao, "Emerging Security Technologies for Mobile User Accesses", Accepted by the electronic Journal on E-Commerce Tools and Applications (eJETA), 2008.

* cited by examiner

*Primary Examiner* — Minh D Dao
(74) *Attorney, Agent, or Firm* — Allen, Dyer, Doppelt, Milbrath & Gilchrist, P.A.

(57) ABSTRACT

A communications system may include at least one first near field communication (NFC) device associated with an object, and a mobile wireless communications device. The mobile wireless communications device may include a second NFC device configured to communicate with the at least one first NFC device based upon proximity thereto, an image sensor, and a controller coupled to the second NFC device and the image sensor. The controller may be configured to determine at least one archive image of the object based upon NFC communication between the second NFC device and the at least one first NFC device, determine a sensed image of the object from the image sensor, and perform image comparison between the at least one archive image and the sensed image.

20 Claims, 10 Drawing Sheets

MOBILE WIRELESS COMMUNICATIONS DEVICE PROVIDING OBJECT COMPARISON FEATURES BASED UPON NEAR FIELD COMMUNICATION (NFC) AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
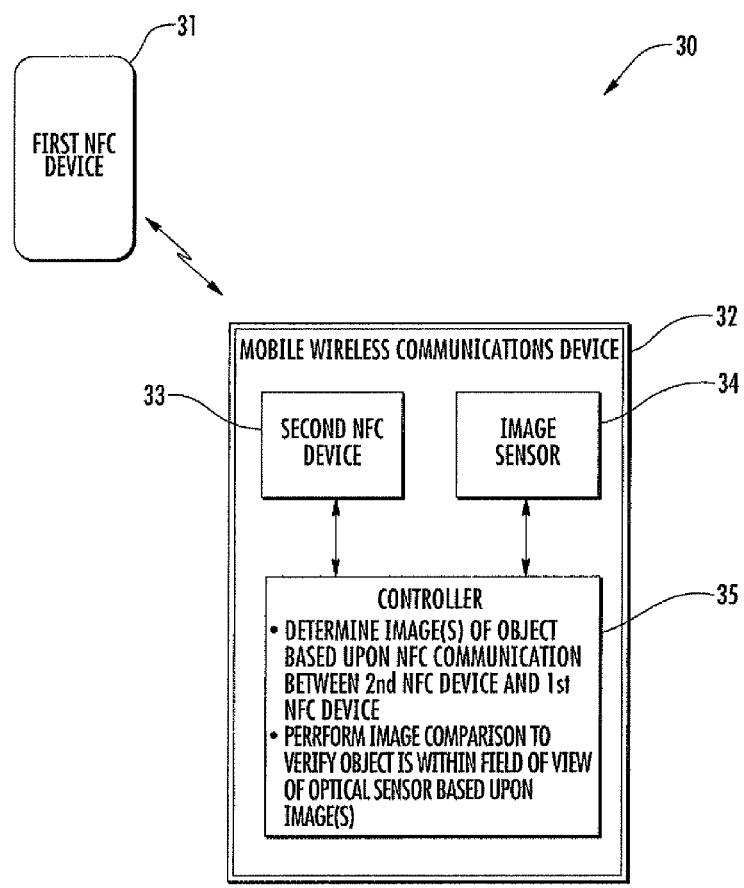
FIG. 1 is a schematic block diagram of a communications system in accordance with an example embodiment.

The present description is made with reference to the accompanying drawings, in which embodiments are shown. However, many different embodiments may be used, and thus the claims should not be construed as limited to the embodiments set forth herein. Rather, these embodiments are provided so that this disclosure will be thorough and complete. Like numbers refer to like elements throughout, and prime notation and multiple prime notation are used to indicate similar elements or steps in alternative embodiments.

Generally speaking, a communications system is disclosed herein which may include at least one first near field communication (NFC) device associated with an object, and a mobile wireless communications device. The mobile wireless communications device may include a second NFC device configured to communicate with the at least one first NFC device based upon proximity thereto, an image sensor, and a controller coupled to the second NFC device and the image sensor. The controller may be configured to determine at least one stored image of the object based upon NFC communication between the second NFC device and the at least one first NFC device, determine a sensed image of the object from the image sensor, and perform image comparison between the at least one stored image and the sensed image. The system may therefore advantageously simplify the task of monitoring or tracking objects (e.g., people) through the use of NFC communication and image recognition techniques.

More particularly, the mobile wireless communications device may further include a display coupled to the controller, and the controller may be further configured to display the sensed image on the display along with verification indicia based upon matching of the at least one stored image and the sensed image. Also, the controller may further be configured to display the sensed image on the display along with verification failure indicia based upon failed matching of the at least one stored image and the sensed image.

The at least one NFC device may comprise a plurality of NFC devices each associated with a respective object. As such, the controller may be configured to determine the at least one stored image for each object based upon NFC communication with a respective NFC device, and the controller may be further configured to perform image recognition based upon the stored images and the sensed image. By way of example, the controller may be further configured to determine at least one stored image of the object by downloading the at least one stored image from the at least one NFC device. In accordance with another example, the system may further comprise an object profile server configured to store the at least one stored image, and the controller may be configured to determine the at least one stored image by downloading the at least one stored image from the object profile server.

The controller may also be configured to determine an age of the at least one stored image, and perform image recognition based upon a threshold age. In this way, the controller may "filter" stored images older than a desired age from consideration to help expedite the object recognition processing, for example. By way of example, the object may comprise a face, and the controller may perform image recognition based upon facial features determined from the at least one stored image and the sensed image. In accordance with another example aspect, the at least one NFC device may comprise a plurality of NFC devices for a respective plurality of objects, and the controller may be configured to generate a missing object alert based upon failed matching of the stored images and the sensed image.

A mobile wireless communications device, similar to the one described briefly above, and a related communications method are also provided. The method may include determining at least one stored image of the object at the mobile wireless communications device based upon NFC communication between the second NFC device and the at least one NFC device, determining a sensed image of the object from the image sensor at the mobile wireless communications device, and performing image recognition between the at least one stored image and the sensed image at the mobile wireless communications device.

A related non-transitory computer-readable medium for use with a mobile wireless communications device, such as the one described briefly above, may have computer-executable instructions for causing the mobile wireless communications device to perform various steps. The steps may include communicating with at least one NFC device associated with an object via NFC communication, determining at least one stored image of the object based upon the NFC communication between the second NFC device and the at least one NFC device, determining a sensed image of the object from the image sensor, and performing image recognition between the at least one stored image and the sensed image.

Figure 8:
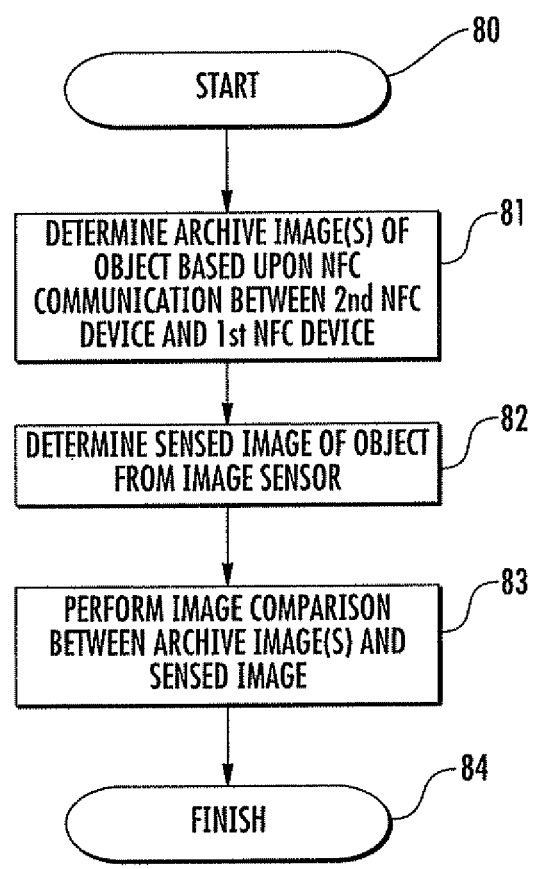
FIGS. 8 and 9 are flow diagrams illustrating example method aspects associated with the systems and devices of FIGS. 1-7.
Figure 9:
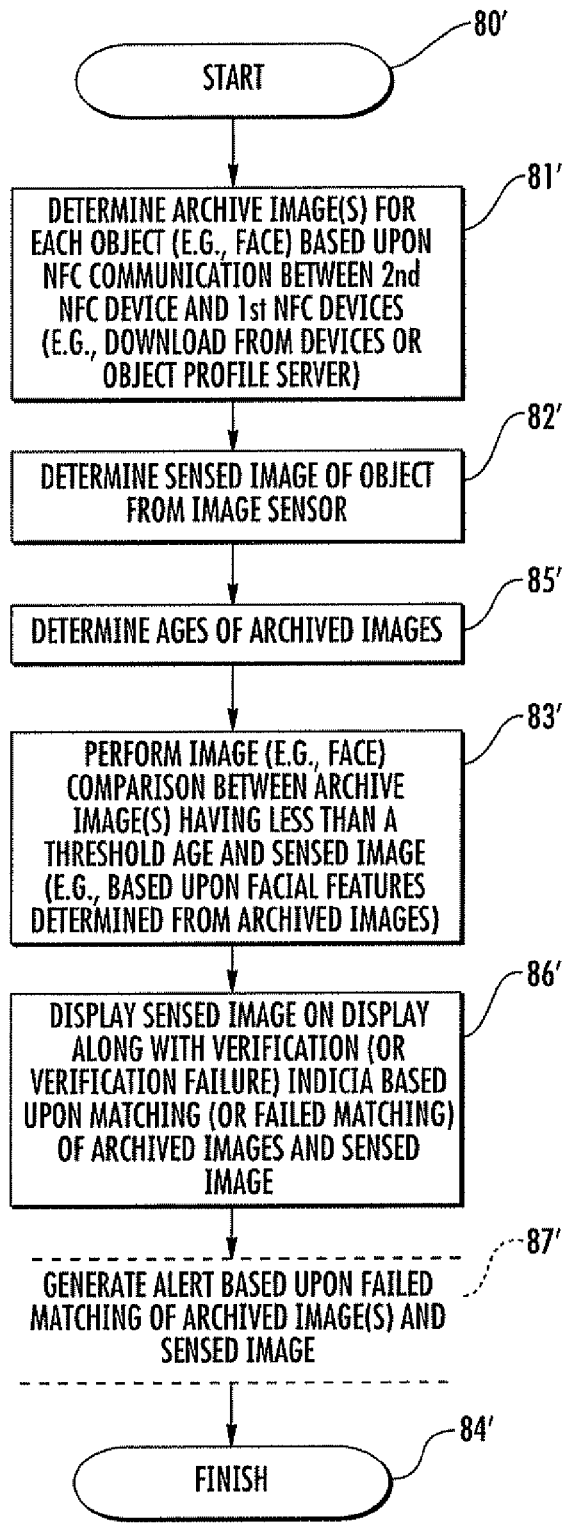

Referring initially to FIGS. 1, 8 and 9, a communications system 30 and related method aspects are first described. The system 30 illustratively includes a first near field communication (NFC) device 31 associated with an object, and a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, electronic book readers, digital cameras, etc.

By way of example, the object associated with the NFC device 31 may be a person, and more particularly a face of the person. For clarity of explanation, the example embodiments described herein will generally be made with reference to human faces being the objects to be recognized through image (i.e., facial) recognition techniques, but it will be appreciated that recognition of other types of objects (e.g., animals, statues, paintings, etc.) may be performed in various embodiments.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters, typically 4 cm or less, but other suitable versions of near-field communication which may have different operating frequencies, effective ranges, etc., for example, may also be used.

The mobile device 32 illustratively includes a second NFC device 33 (e.g., an NFC transceiver) configured to communicate with the NFC device 31 based upon proximity thereto using NFC communication, an image sensor 34, and a controller 35 coupled with the second NFC device and the image sensor. By way of example, the image sensor 34 may comprise one or more digital camera or image capture components, such as a lens, a charge-coupled device (CCD), etc. The controller 35 may be implemented using hardware (e.g., processor, memory, etc.) and software components, i.e., computer-readable instructions for causing the mobile device 32 to perform the various functions or operations described herein. The NFC device 31 may be an NFC tag, an NFC-enabled mobile device, etc.

Figure 2:
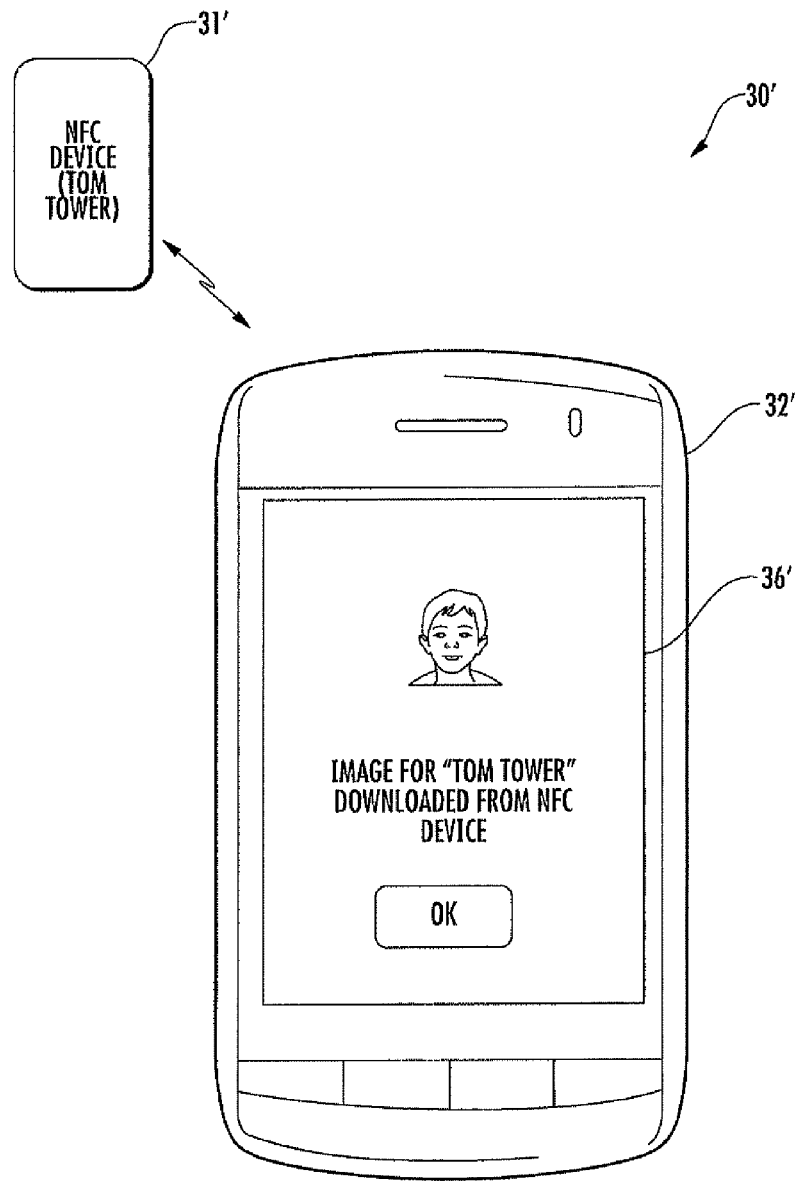
FIG. 2 is a schematic block diagram of an alternative example embodiment of the communications system of FIG. 1.

Beginning at Blocks 80, 80', the controller 35 is configured to determine at least one stored or archived image of the object based upon NFC communication between the second NFC device 33 and the first NFC device 31, at Blocks 81, 81'. More particularly, an archive image may include a previously stored image (e.g., a digital image) of the object in question. Generally speaking, the archive image is an image that may be used for a later image recognition comparison operations. Referring additionally to the example embodiment of the system 30' shown in FIG. 2, the archive image may be previously stored on the NFC device 31' and downloaded to the mobile device 32' via NFC communication (or other suitable communication formats, such as Bluetooth, etc.). That is, in the system 30', the mobile device 32' downloads the archive image(s) directly from the NFC device 31'. In this example, the NFC device 31' is associated with a person named "Tom Tower", and the image in question comprises an image of Tom's face, which is shown on a display 36' of the mobile device 32'. In this regard, the NFC device 31' may include a memory for storing the image data, and optionally other data associated with Tom Tower, such as biographical or contact information (e.g., name, email, phone number), personal identification (ID) numbers, medical or health information, etc.

Figure 3:
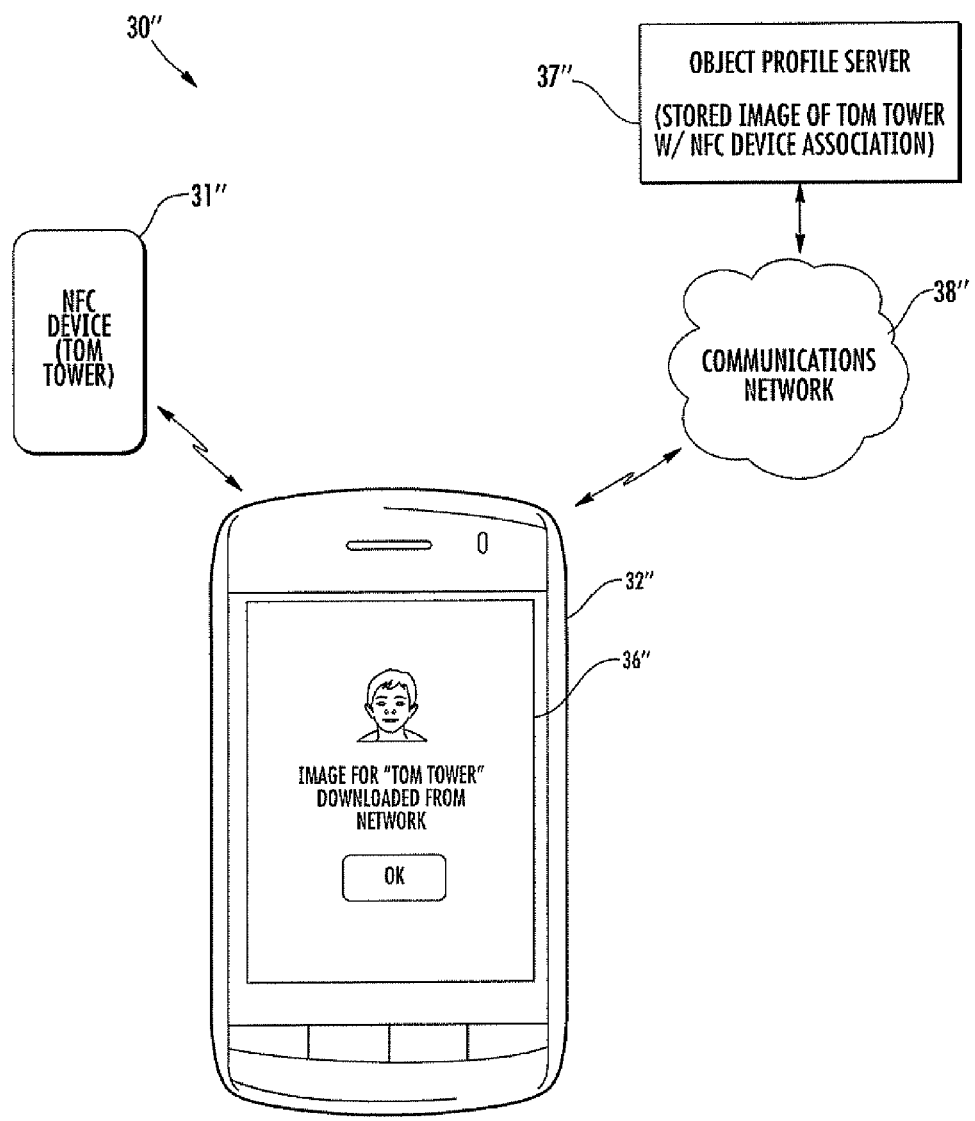
FIG. 3 is a schematic block diagram of another example alternative embodiment of the communications system of FIG. 1.

In accordance with another example embodiment now described with reference to FIG. 3, the system 30" further illustratively includes an object profile server 37" that the mobile device 32" communicates with via one or more communications networks 38" (e.g., wireless local area network (WLAN), cellular network, Internet, etc.). Here, a profile and archive image(s) of Tom Tower is stored or otherwise maintained by the object profile server 37", and the mobile device 32" downloads the image(s) of Tom Tower (and, optionally, other information such as that described above) from the object profile server via the communications network(s) 38". By way of example, the object profile server 37" may be implemented as an Internet-based service. For example, archive images or personal information may advantageously be stored as part of a social networking profile (e.g., Facebook, etc.), with which the mobile device 32" interacts upon obtaining an ID, password, etc., from the NFC device 31" via NFC communication. That is, the NFC device 31" advantageously provides a quick approach for a personal profile stored on the object profile server 37" to be identified to the mobile device 32" so that it may download the requisite archive image(s) for face recognition based thereon, as well as other information regarding the person, if appropriate. As another example, the archive images or personal information may be part of an address book (e.g., Outlook address book (which might be on a mobile device or an Exchange server), Gmail address book, etc.). It should be noted that different archive images may be used for image recognition in different embodiments, such as front, side, perspective, or other views to provide higher chances for positive matches. Moreover, in some example embodiments multiple archived images may be used for comparison (for one or more sources), which may advantageously provide enhanced facial recognition accuracy in some instances.

Referring again to FIG. 1, it should be noted that in some embodiments the archive image(s) may be captured by the image sensor 34 at the time of NFC communication between the second NFC device 33 and the first NFC device 31. For example, when the NFC device 31 and mobile device 32 engage in NFC communication, the controller 35 may prompt a user to take a picture of the person (or object) associated with the NFC device 31, which is then stored by the controller as the archive image for subsequent face recognition comparisons. The controller 35 may also associate the archive image with any other information (e.g., name, ID number, etc.) obtained from the NFC device (or from an object profile server, in some embodiments).

Figure 4:
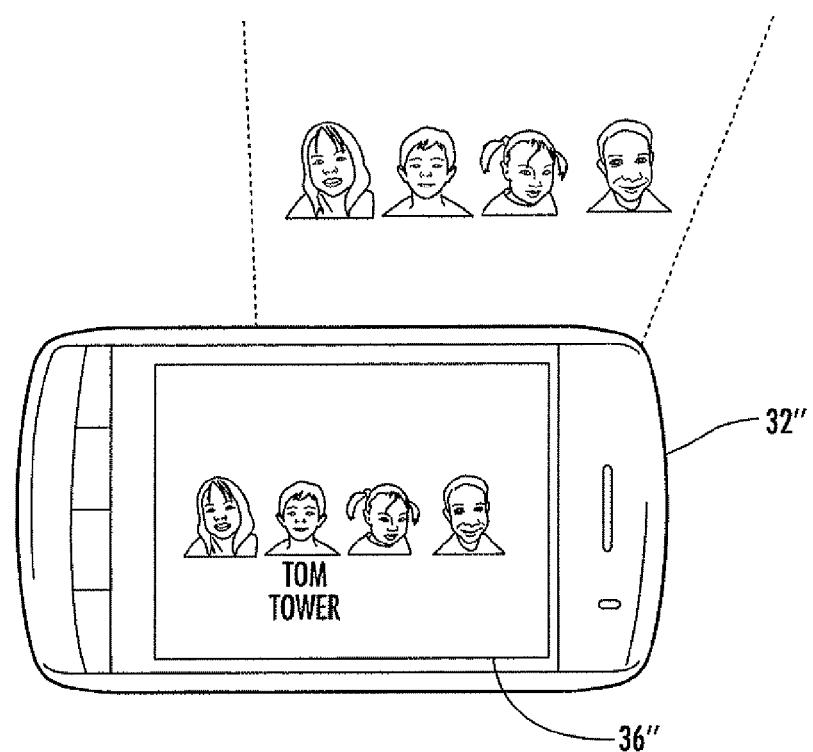
FIG. 4 is a schematic view of the mobile device of the system of FIG. 3 performing image recognition based upon a sensed image of a group of children.

The controller 35 is further configured to determine a sensed image of the object from the image sensor 34, at Blocks 82, 82'. For example, the controller may cause the image sensor 34 to capture a single image or a continuous stream of images, as in the case with taking a digital picture or a digital video. In the example of FIG. 4, a group of children including Tom Tower is in the field of view or viewfinder of the mobile device 32", and an image captured by its image sensor (e.g., camera) is displayed on the display 36".

Furthermore, the controller 35 is also configured to perform image recognition between the archive image(s) and the sensed image, at Blocks 83, 83', which illustratively concludes the methods (Block 84, 84'). In the case where the objects to be recognized comprise faces, facial recognition processing techniques may be used to identify or verify a person from a digital image or a video frame from a video source. This may be done by comparing selected facial features from the sensed image and the archived images, which may be stored in a database, for example. Similar recognition processing may be used for other types of objects, such as those discussed above.

In the example illustrated in FIG. 4, not only is the sensed image displayed on the display 36", verification indicia is also displayed based upon matching of the archive image and the sensed image, at Block 86' (FIG. 9). In the present example, the face of Tom Tower is recognized from his archived image (s), and the verification indicia "Tom Tower" (i.e., the name of the recognized person) is displayed adjacent the recognized face. Other text verification may also be used, as well as other types of verification indicia, such as symbols or icons, outlining, highlighting, etc.

Figure 5:
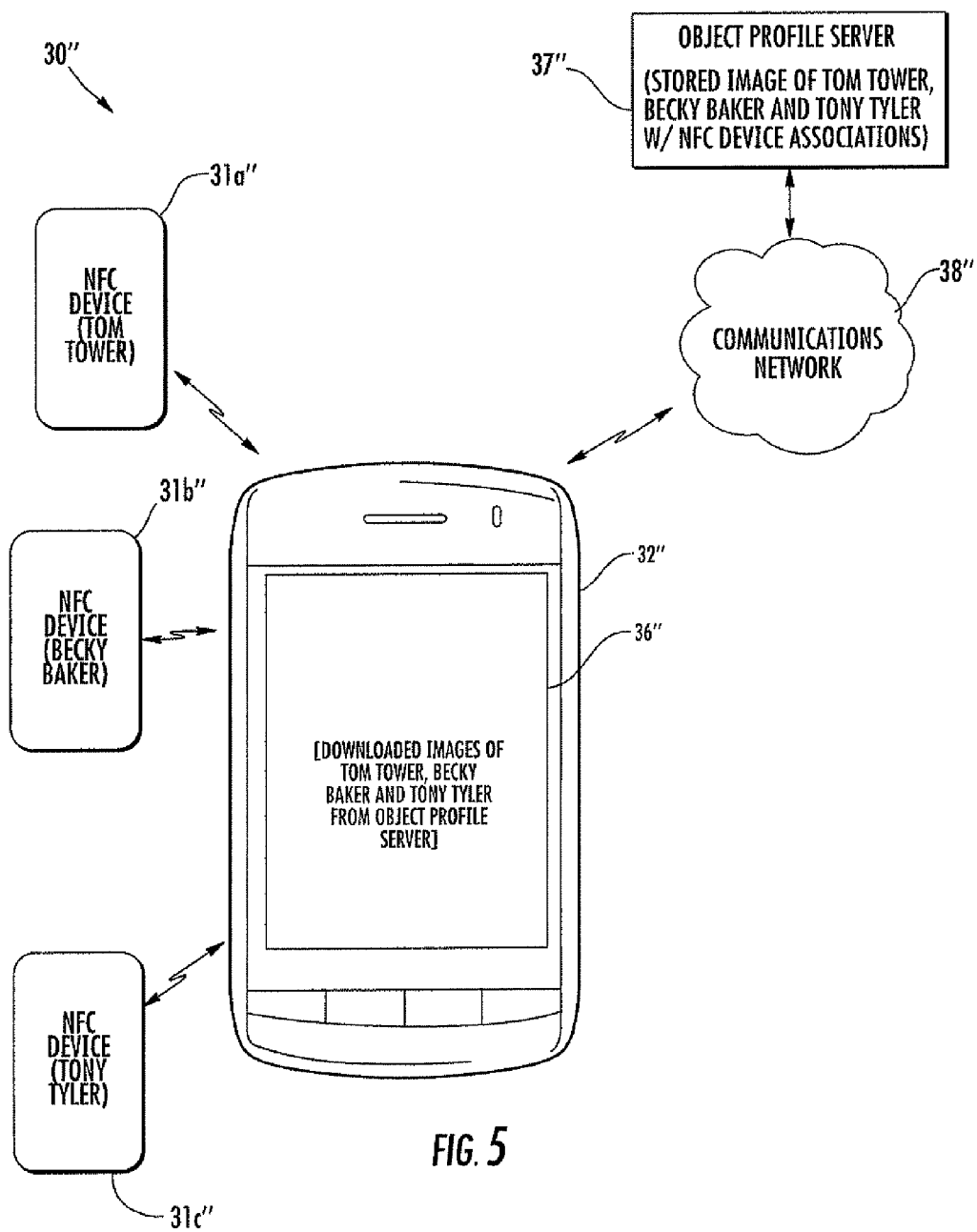
FIG. 5 is a schematic block diagram of the system of FIG. 3 with a plurality of NFC devices.
Figure 6:
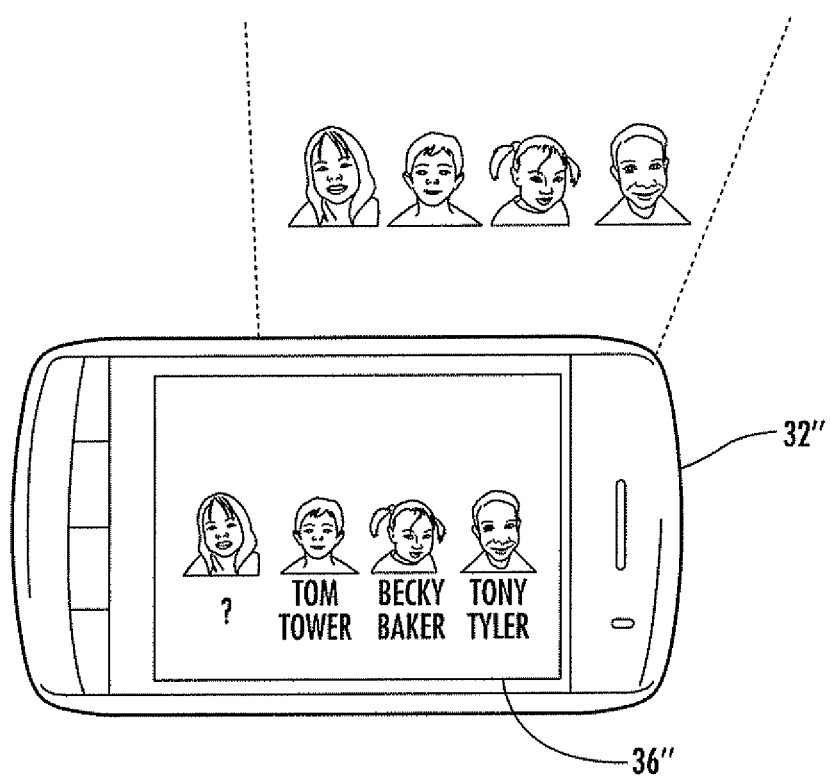
FIG. 6 is a schematic view of the mobile device of the system of FIG. 5 performing image recognition based upon a sensed image of a group of children.

Referring additionally to FIGS. 5 and 6, in some embodiments verification failure indicia may also be displayed along with the sensed image on the display. In other words, the display of the sensed image may be supplemented with verification information to provide an augmented reality (AR) view. In the illustrated example, a plurality of NFC devices 31a", 31b', and 31c" respectively associated with Tom Tower, Becky Baker, and Tony Tyler are initially scanned or swiped with the mobile device 32", and the respective archived images for these persons are downloaded from the object profile server 37". At the time when the image capture of the children occurs in the example of FIG. 6, Tom, Becky, and Tony are recognized and corresponding verification indicia (e.g., their names) are displayed on the display 36". However, one other child is also present in the sensed image, for which the mobile device 32" does not have any archived images (or for which it cannot make a positive match with the archived image(s) that it does have). A question mark symbol is displayed as verification failure indicia on the unrecognized child in the illustrated example, but here again other indicia may also be used.

In some applications, it may also be desirable to filter archived images when performing image recognition to advantageously reduce the number of archive images that require searching to determine matches, and thereby decrease processing time. By way of example, the controller 33 may be configured to determine an age of the archive images, and perform image recognition based a threshold age. In this way, the controller 33 may filter archive images older than a desired age from consideration to help expedite the object recognition processing, for example. This may allow a comparison to be performed using only archived images stored within a prior period of minutes, hours, days, weeks, etc.

Figure 7:
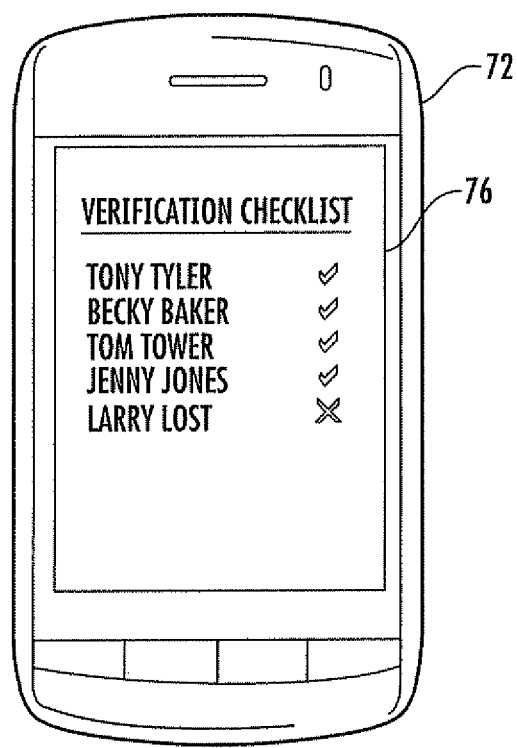
FIG. 7 is a schematic block diagram of an example mobile wireless communications device providing a missing object alert.

In accordance with another example aspect, the controller 33 may also optionally be configured to generate a missing object alert based upon failed matching of the archive images and the sensed image, at Block 87' (FIG. 9). For example, as shown in FIG. 7, a mobile device 72 includes a display 76 with a list of five children (i.e., Tony Tyler, Becky Baker, Tom Tower, Jenny Jones, and Larry Lost) for whom respective archive images have been obtained. As image recognition is performed to determine if the faces of these five children are all in a sensed image. In the illustrated example, all faces but the face of Larry Lost are recognized, and an "X" mark is provided as an alert that Larry Lost is not present in the sensed image. Moreover, check marks are provided to indicate that the rest of the children are present within the sensed image.

The above-described embodiments advantageously allow for NFC and AR (Augmented Reality) to provide a basis for tracking people (or other objects), and address a problem of keeping track of people from whom NFC exchanges have occurred. Some examples of where the above-described approach may be used include business meetings or events, chaperoning of groups of children, tour groups, etc. When in a large group, the mobile device 32 may be directed at a group of people, and all of the individuals who have passed along their archived images via respective NFC devices 31 are identified or recognized accordingly. Those who are not are then candidates for establishing NFC communications with their respective NFC devices 31. Another option is that the mobile device 32 may be used to discreetly sense images of people in a group where names have been forgotten, and the AR identification may advantageously be used to provide a reminder of the forgotten names.

In accordance with one example use case, a chaperone may be responsible for a group of twenty students. Each student "bumps" his or her NFC enabled phone or NFC tag to the mobile device of the chaperone at the beginning of the outing. Then, during or after the outing, the chaperone takes a picture of the collection of students with the mobile device camera, and she can see any student that is not there, as described above. If other students have appeared that do not belong in the group, their faces will not be recognized and may be identified by verification failure indicia, as noted above.

Example components of a mobile wireless communications device 1000 that may be used in accordance with the above-described embodiments are further described below with reference to FIG. 10. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 10:
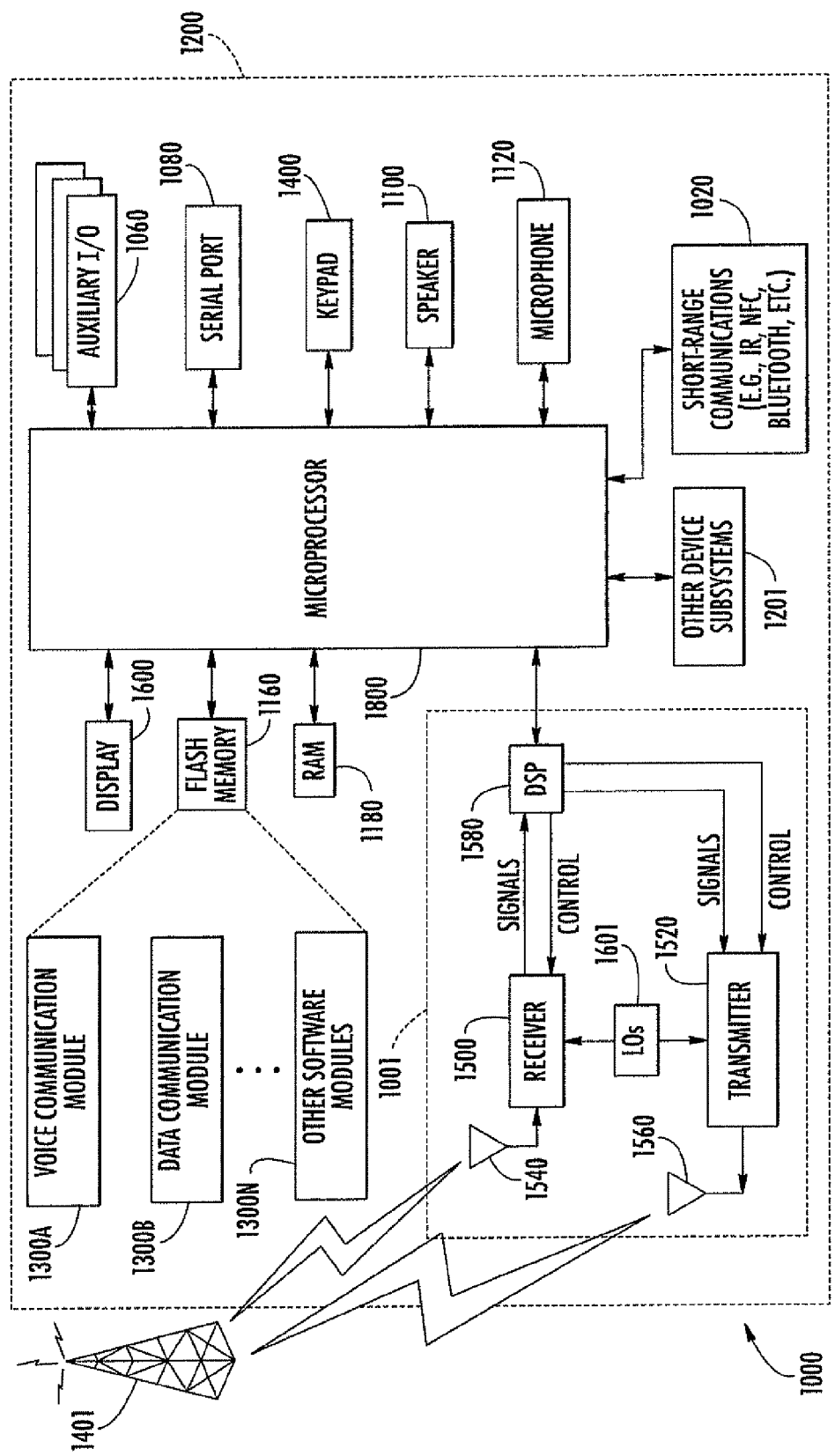
FIG. 10 is a schematic block diagram illustrating example components of a mobile wireless communications device that may be used in accordance with various implementations.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device for use with at least one first near field communication (NFC) device associated with an object, the mobile wireless communications device comprising:
    a second NFC device configured to communicate with said at least one first NFC device based upon proximity thereto;
    an image sensor; and
    a controller coupled with said second NFC device and said image sensor, the controller being configured to
        determine at least one archive image of the object based upon NFC communication between said second NFC device and said at least one first NFC device, and download the at least one archive image from said at least one NFC device based thereon,
determine a sensed image of the object from said image sensor, and
perform image comparison between the at least one archive image and the sensed image.

2. The communications system of claim 1 wherein said mobile wireless communications device further comprises a display coupled with said controller; and wherein said controller is further configured to display the sensed image on said display along with verification indicia based upon matching of the at least one archive image and the sensed image.

3. The communications system of claim 1 wherein said mobile wireless communications device further comprises a display coupled with said controller; and wherein said controller is further configured to display the sensed image on said display along with verification failure indicia based upon failed matching of the at least one archive image and the sensed image.

4. The communications system of claim 1 wherein said at least one NFC device comprises a plurality of NFC devices each associated with a respective object; wherein said controller is configured to determine the at least one archive image for each object based upon NFC communication with a respective NFC device; and wherein said controller is further configured to perform image comparison based upon the archived images and the sensed image.

5. The communications system of claim 1 wherein said controller is configured to determine an age of the at least one archive image and perform image comparison based upon a threshold age.

6. The communications system of claim 1 wherein the object comprises a face; and wherein said controller performs image comparison based upon facial features determined from the at least one archive image and the sensed image.

7. The communications system of claim 1 wherein said at least one NFC device comprises a plurality of NFC devices for a respective plurality of objects; and wherein said controller is configured to generate a missing object alert based upon failed matching of the archive images and the sensed image.

8. A mobile wireless communications device for use with at least one first near field communication (NFC) device associated with an object, the mobile wireless communications device comprising:
a second NFC device configured to communicate with the at least one NFC device based upon proximity thereto;
an image sensor; and
a controller coupled with said second NFC device and said image sensor, the controller being configured to
determine at least one archive image of the object based upon NFC communication between said second NFC device and the at least one first NFC device, and download the at least one archive image from an object profile server based thereon,
determine a sensed image of the object from said image sensor, and
perform image comparison between the at least one archive image and the sensed image.

9. The mobile wireless communications device of claim 8 further comprising a display coupled with said controller; and wherein said controller is further configured to display the sensed image on said display along with verification indicia based upon matching of the at least one archive image and the sensed image.

10. The mobile wireless communications device of claim 8 further comprising a display coupled with said controller; and wherein said controller is further configured to display the sensed image on said display along with verification failure indicia based upon failed matching of the at least one archive image and the sensed image.

11. The mobile wireless communications device of claim 8 wherein the at least one NFC device comprises a plurality of NFC devices each associated with a respective object; wherein said controller is configured to determine the at least one archive image for each object based upon NFC communication with a respective NFC device; and wherein said controller is further configured to perform image comparison based upon the archived images and the sensed image.

12. A communications method comprising:
determining at least one archive image of an object associated with at least one first near field communication (NFC) device at a mobile wireless communications device based upon NFC communication between the at least one first NFC device and the mobile wireless communications device, and downloading the at least one archive image from the at least one NFC device based thereon;
determining a sensed image of the object from the image sensor at the mobile wireless communications device; and
performing image comparison between the at least one archive image and the sensed image at the mobile wireless communications device.

13. The method of claim 12, wherein the mobile wireless communications device further comprises a display, the method further comprising displaying the sensed image on the display along with verification indicia based upon matching of the at least one archive image and the sensed image.

14. The method of claim 12, wherein the mobile wireless communications device further comprises a display, the method further comprising displaying the sensed image on the display along with verification failure indicia based upon failed matching of the at least one archive image and the sensed image.

15. The method of claim 12 wherein the at least one NFC device comprises a plurality of NFC devices each associated with a respective object; wherein said determining the at least one archive image comprises determining the at least one archive image for each object based upon NFC communication with a respective NFC device; and wherein said performing image comparison further comprises performing image comparison based upon the archived images and the sensed image.

16. A non-transitory computer-readable medium for use with a mobile wireless communications device comprising an image sensor, the non-transitory computer-readable medium having computer-executable instructions for causing the mobile wireless communications device to perform steps comprising:
communicating with at least one NFC device associated with an object via NFC communication;
determining at least one archive image of the object based upon the NFC communication between the mobile wireless communications device and the at least one NFC device, and downloading the at least one archive image from the at least one NFC device based thereon;
determining a sensed image of the object from the image sensor; and
performing image comparison between the at least one archive image and the sensed image.

17. The non-transitory computer-readable medium of claim 16 wherein the mobile wireless communications device further comprises a display; and the non-transitory computer-readable medium further having computer-executable instructions for causing the mobile wireless communications device to perform a step comprising displaying the sensed image on the display along with verification indicia based upon matching of the at least one archive image and the sensed image.

18. The non-transitory computer-readable medium of claim 16 wherein the mobile wireless communications device further comprises a display; and the non-transitory computer-readable medium further having computer-executable instructions for causing the mobile wireless communications device to perform a step comprising displaying the sensed image on the display along with verification failure indicia based upon failed matching of the at least one archive image and the sensed image.

19. The non-transitory computer-readable medium of claim 16 wherein the at least one NFC device comprises a plurality of NFC devices each associated with a respective object; wherein said determining the at least one archive image comprises determining the at least one archive image for each object based upon NFC communication with a respective NFC device; and wherein said performing image comparison further comprises performing image comparison based upon the archived images and the sensed image.

20. A mobile wireless communications device for use with at least one first near field communication (NFC) device associated with an object, the mobile wireless communications device comprising:
- a second NFC device configured to communicate with the at least one first NFC device based upon proximity thereto;
- an image sensor; and
- a controller coupled with said second NFC device and said image sensor, the controller being configured to
  - determine at least one archive image of the object based upon NFC communication between said second NFC device and the at least one first NFC device,
  - determine an age of the at least one archive image,
  - determine a sensed image of the object from said image sensor, and
  - perform image comparison between the at least one archive image and the sensed image based upon the determined age and a threshold age.

* * * * *